(12) United States Patent
Ma

(10) Patent No.: US 6,222,802 B1
(45) Date of Patent: Apr. 24, 2001

(54) DEVICE AND METHOD FOR AUTOMATICALLY CONTROLLING SLED LOOP GAIN IN OPTICAL DISC DRIVE

(75) Inventor: Byung-In Ma, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/080,403

(22) Filed: May 18, 1998

(51) Int. Cl.$^7$ ............................................. G11B 7/00
(52) U.S. Cl. ............................ 369/44.28; 369/44.29; 369/44.35
(58) Field of Search ........................... 369/44.28, 44.29, 369/44.35, 44.36

(56) References Cited

U.S. PATENT DOCUMENTS

| | | | |
|---|---|---|---|
| 4,835,754 | * 5/1989 | Yamamoto et al. | 369/44.28 X |
| 5,054,013 | * 10/1991 | Kawamura | 369/44.28 OR |
| 5,146,443 | * 9/1992 | Iwase et al. | 369/44.29 OR |
| 5,548,569 | * 8/1996 | Shimizume et al. | 369/44.28 OR |
| 5,886,963 | * 3/1999 | Abe et al. | 369/44.29 X |
| 5,896,353 | * 4/1999 | Naohara | 369/44.28 X |

* cited by examiner

Primary Examiner—Aristotelis M. Psitos
(74) Attorney, Agent, or Firm—Staas & Halsey LLP

(57) ABSTRACT

A device for automatically controlling a sled loop gain in an optical disc drive having a sled motor. The device includes a pickup for irradiating a laser beam onto an optical disc and receiving a reflected beam to read a signal recorded on the optical disc; a tracking error detector to detect an error signal from the read signal; a phase compensator to compensate for a phase deviation of the tracking error signal; a first lowpass filter to control the phase-compensated tracking error signal according to a fixed gain thereof; a controller to cause the pickup to jump N tracks when the laser beam is on-track, and determine the sled loop gain to control a signal output from the first lowpass filter to be changed to a minimum driving voltage upon completion of the track jump; a second lowpass filter to control the signal output from the first lowpass filter according to the sled loop gain generated from the controller; and a sled motor driver to drive the sled motor according to a signal output from the second lowpass filter.

20 Claims, 3 Drawing Sheets

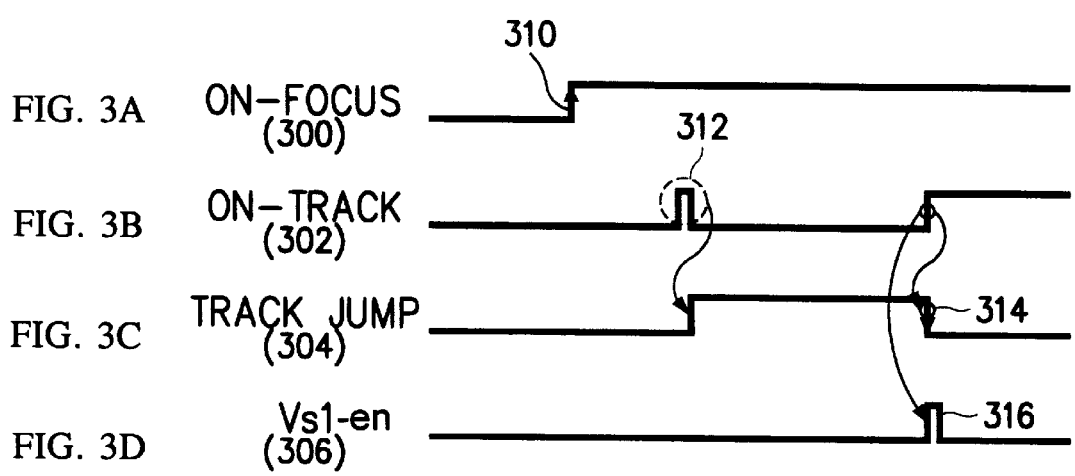

DEVICE AND METHOD FOR AUTOMATICALLY CONTROLLING SLED LOOP GAIN IN OPTICAL DISC DRIVE

CROSS-REFERENCE TO RELATED APPLICATIONS

This application claims the benefit of Korean Application No. 1997-19222, filed May 19, 1997, in the Korean Industrial Property Office.

BACKGROUND OF THE INVENTION

1. Field of the Invention

The present invention relates to an optical disc drive, and in particular, to a device and method for automatically controlling a sled loop gain for determining a driving voltage level of a sled motor.

2. Description of the Related Art

An optical disc drive for use in a digital video disc (hereinafter referred to as DVD) player or a compact disc (CD) player performs a focusing operation for shifting a lens up and down, and a tracking operation for shifting the lens to the left and right to settle the lens to direct a laser beam in an on-track position.

The tracking consists of two tracking steps. One is to drive a sled motor in order for a pickup to approach a target track, and another is to control a driving voltage provided to a tracking actuator to finely shift the tip of the lens to the target track. The former tracking step can shift the lens widely, but can not shift the lens promptly due to an inertia moment. The latter tracking step has a fast response, but has a narrow movable range of the pickup.

Accordingly, in order for the lens to jump over many tracks, the optical disc drive first shifts the lens by using the former tracking step, and then performs a fine tracking by using the latter tracking step. Furthermore, when the optical disc drive is driven in the state that the laser beam is on-track, the lens is finely tracked by the latter tracking step so as to shift to an outer circumference along the track on the optical disc. In order to compensate for the lean of the lens toward the outer circumference due to the fine tracking, the optical disc drive shifts the pickup by means of the former tracking step.

However, the conventional optical disc drive has a fixed sled loop gain for controlling the driving voltage supplied to the sled motor to compensate for the lean to be equal to a minimum driving voltage VsmvO for shifting the pickup. On the other hand, every product has a slightly different minimum driving voltage Vsmv0 for driving the pickup to shift over the track. Therefore, each product has low reliability.

SUMMARY OF THE INVENTION

It is therefore an object of the present invention to provide a device and method for automatically controlling a sled loop gain so as to control a driving voltage, detected when a laser beam passed through a lens and onto an optical disc is on-track after jumping tracks, to be changed to a minimum driving voltage.

Additional objects and advantages of the invention will be set forth in part in the description which follows and, in part, will be obvious from the description, or may be learned by practice of the invention.

To achieve the foregoing and other objects, according to an aspect of the present invention, there is provided a device for automatically controlling a sled loop gain in an optical disc drive having a sled motor. The device includes a pickup for irradiating a laser beam onto an optical disc and receiving a reflected beam to read a signal recorded on the optical disc; a tracking error detector connected to the pickup so as to receive the read signal of the pickup, to detect a tracking error signal from the read signal; a phase compensator connected to the tracking error detector, to compensate for a phase deviation of the tracking error signal; a first lowpass filter connected to the phase compensator, to control the phase-compensated tracking error signal according to a fixed gain thereof; a controller to cause the pickup to jump N tracks when the laser beam is on-track, and determine the sled loop gain for controlling a signal output from the first lowpass filter to be changed to a minimum driving voltage upon completion of the track jump; a second lowpass filter to control the signal output from the first lowpass filter according to the sled loop gain generated from the controller; and a sled motor driver to drive the sled motor according to a signal output from the second lowpass filter.

According to another aspect of the present invention, there is provided a method for automatically controlling a sled loop gain in an optical disc drive having a pickup including a lens and a laser diode. The method includes the steps of: (a) compensating for a phase deviation of a tracking error signal detected from a signal read from an optical disc, and controlling the phase-compensated tracking error signal according to a fixed gain; (b) causing the lens to jump N tracks when a laser beam passed through the lens is on-focus and on-track; (c) reading the gain controlled signal generated at the step (a), if the laser beam passed through the lens is on-track after jumping N tracks; (d) determining the sled loop gain for controlling the signal read at the step (c) to be changed to a minimum driving voltage for driving a sled motor; and (e) controlling the signal output generated at the step (a) according to the sled loop gain.

BRIEF DESCRIPTION OF THE DRAWINGS

The above objects and other advantages of the present invention will become more apparent by describing the preferred embodiment of the present invention with reference to the attached drawings, in which:

FIGS. 3A through 3D are operational timing diagrams of the device shown in FIG. 1.

DETAILED DESCRIPTION OF THE PREFERRED EMBODIMENT

A preferred embodiment of the present invention will be described in detail hereinbelow with reference to the accompanying drawings. For a comprehensive understanding of the present invention, the same will be illustratively described, confined to the specific embodiment. However, it should be noted that the present invention can be implemented by anyone skilled in the art with the description, not the details. In the following description, well-known functions or constructions which may obscure the present invention in unnecessary detail are not described in detail.

Figure 1:
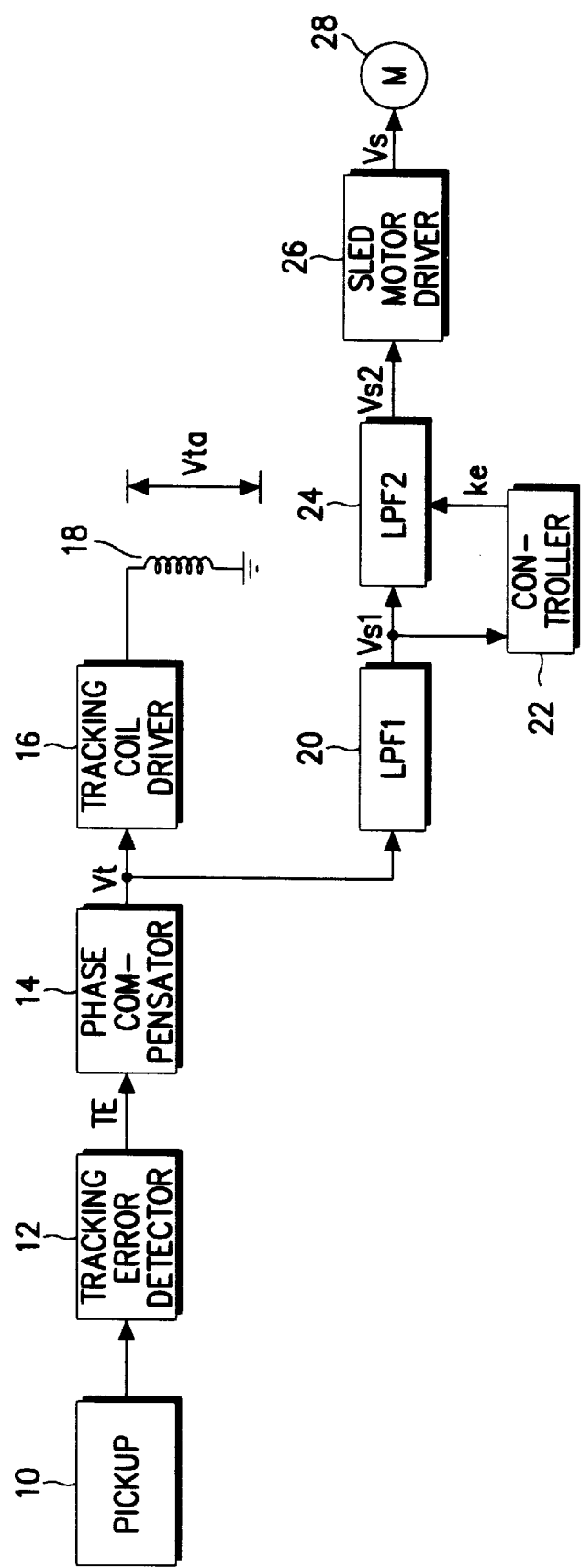
FIG. 1 is a block diagram of a device for automatically controlling a sled loop gain according to an embodiment of the present invention.

FIG. 1 illustrates a structure of a tracking servomechanism with a device for automatically controlling a sled loop gain according to an embodiment of the present invention. The tracking servomechanism actuates the lens in a lateral direction to irradiate a laser beam onto a track of an optical disc accurately.

Referring to FIG. 1, a pickup 10 includes a lens and a laser diode irradiates a laser beam onto a surface of the optical disc (not shown) to read an information signal recorded on the optical disc according to the quantity of a reflected beam. The quantity of the reflected beam varies according to a position of the optical disc onto which the laser beam is irradiated. A tracking error detector 12 detects a tracking error from the quantity of the reflected beam provided from the pickup 10 to generate a tracking error signal TE. The tracking error signal TE is used to generate a driving voltage for shifting the pickup 10 to settle the lens to direct the laser beam in the on-track position. A phase compensator 14 compensates for a phase deviation of the tracking error signal TE to generate a driving voltage Vt for tracking. A tracking coil driver 16 receives the driving voltage Vt and generates, to a tracking actuator 18, a tracking voltage Vta for finely tracking the tip of the lens in the lateral direction. The tracking actuator 18 shifts the lens of the pickup 10 a certain distance in a specified direction according to a polarity and level of the tracking voltage Vta.

A first lowpass filter (LPF1) 20 with a fixed gain controls the driving voltage Vt supplied from the phase compensator 14 according to the fixed gain, and generates a gain controlled voltage Vs1. A controller 22 causes the pickup 10 to jump N tracks upon detecting an on-track state of the laser beam (connection not shown). Furthermore, the controller 22 determines a sled loop gain Ke such that the driving voltage Vs1 generated from the first lowpass filter 20 immediately after the pickup 10 jumps N tracks is changed to the minimum driving voltage Vsmv0. The controller 22 properly sets the number N in consideration of a viewing angle of the lens. For instance, in a compact disc (CD) player, the number N is set to 150. The controller 22 may be embodied by using a digital signal processor (DSP). A second lowpass filter 24 compensates for the gain controlled voltage Vs1 according to the sled loop gain Ke, to generate a driving voltage Vs2 for tracking the pickup 10. A sled motor driver 26 generates a driving voltage Vs for driving a sled motor 28 according to the driving voltage Vs2 from the second lowpass filter 24. The sled motor 28 shifts the pickup 10 a certain distance in a specified direction according to the polarity and level of the driving voltage Vs.

Figure 2:
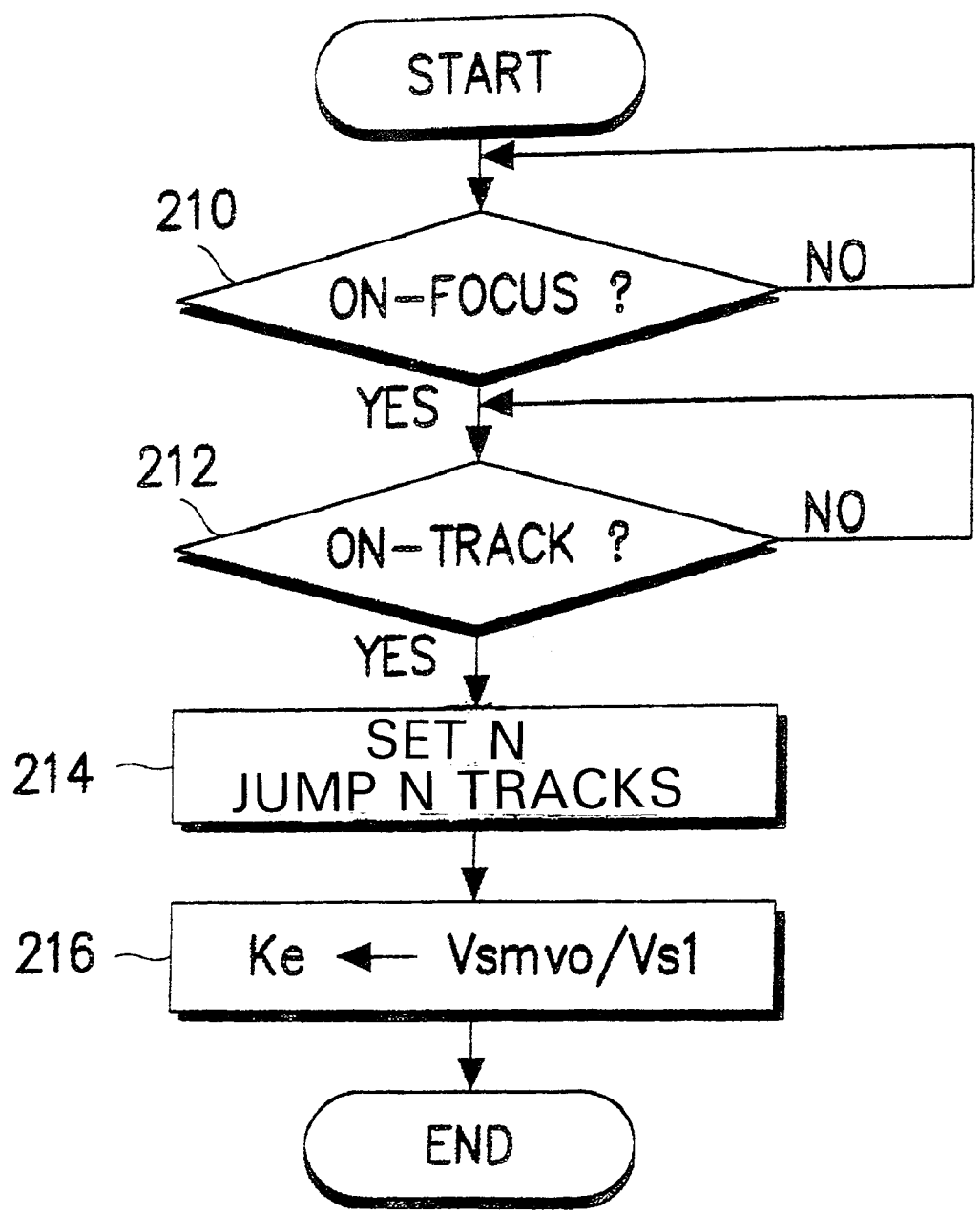
FIG. 2 is a flowchart for automatically controlling the sled loop gain according to the embodiment of the present invention.

FIG. 2 is a flowchart for automatically controlling the sled loop gain Ke according to the preferred embodiment of the present invention, in which the procedure includes a first step of jumping N tracks when the light beam passed through the lens and irradiated on the optical disc is on-focus and on-track, and a second step of determining the sled loop gain Ke such that the driving voltage is changed to the minimum driving voltage Vsmv0 after completion of jumping N tracks.

FIGS. 3A through 3D show operational timing diagrams of the device shown in FIG. 1, in which a reference numeral 300 represents a waveform generated when the laser beam passed through the lens is on-focus, a reference numeral 302 represents a waveform generated when the laser beam passed through the lens is on-track, a reference numeral 304 represents a waveform of a track jump clock for causing the lens to jump N tracks in response to an on-track clock 312 of the waveform 302, and a reference numeral 306 represents a waveform of a clock Vs1-en for reading the driving voltage Vs1 and which is detected after the lens jumps N tracks by the waveform 304. The waveforms 300, 302, 304 and 306 can either be generated by the controller 22 or be the signals received by the controller 22.

Now, the preferred embodiment of the present invention will be described in detail with reference to FIGS. 1 through 3D.

The controller 22 checks, at step 210, whether or not the laser beam passed through the lens is on-focus. If the laser beam passed through the lens is on-focus, the waveform 300 rises at a point 310 as shown in FIG. 3A. If it is judged at the step 210 that the laser beam passed through the lens is on-focus, the optical disc drive settles the laser beam passed through the lens in the on-track position. Specifically, as the optical disc is inserted into the optical disc drive, the pickup 10 reads a signal recorded on the optical disc, and the tracking error detector 12 detects the tracking error from the signal read from the DVD (or CD) to generate the tracking error signal TE. The phase compensator 14 compensates for the phase deviation of the tracking error signal TE to generate the driving voltage Vt. The tracking coil driver 16 receives the driving voltage Vt to provide the tracking actuator 18 with the driving voltage Vta for finely tracking the lens. The optical disc drive shifts the lens according to the polarity and level of the driving voltage Vta. This operation is repeated to settle the lens to direct the laser beam in the on-track position. The driving voltage Vt is applied in common to the first lowpass filter 20 which generates the gain controlled driving voltage Vs1 according to its fixed gain.

If the laser beam is on-track at step 212, the on-track clock 312 is generated as shown in FIG. 3B. Upon detection of the on-track clock 312 at step 212, the controller 22 proceeds to step 214 to jump N tracks according to the track jump clock 304 of FIG. 3C. As shown in FIG. 3C, the track jump clock 304 rises upon generation of the clock 312, lasting for N tracks, and falls down at a point 314. After jumping N tracks, the controller 22 determines the sled loop gain Ke at step 216. Specifically, the controller 22 reads the driving voltage Vs1 generated from the first lowpass filter 20 when the laser beam is on-track after jumping N tracks, in response to a clock 316 of FIG. 3D, to control the sled loop gain Ke such that the read driving voltage Vs1 is changed to the minimum driving voltage Vsmv0, in accordance with the following Equation (1):

$$Ke = \frac{Vsmv0}{Vs1} \qquad (1)$$

where Vsmv0 represents the minimum driving voltage for driving the sled motor 28. The second lowpass filter 24 can generate the minimum driving voltage Vsmv0 for driving the sled motor 28 according to the sled loop gain Ke. That is, upon reading the voltage Vs1, the controller 22 controls the sled loop gain Ke such that the driving voltage Vs1 generated from the first lowpass filter 20 is changed to the minimum driving voltage Vsmv0.

The second lowpass filter 24 receives the driving voltage Vs1 from the first lowpass filter 20 to generate the gain controlled driving voltage Vs2 according to the sled loop gain Ke. The sled motor driver 26 generates the driving voltage Vs for driving the sled motor 28 according to the voltage Vs2 from the second lowpass filter 24. The sled motor 28 drives the pickup 10 according to the driving voltage Vs, to settle the pickup 10 to direct the laser beam in the on-track position. The sled motor driver 26 drives the sled motor 28 when the driving voltage Vs2 is higher than the minimum driving voltage Vsmv0.

As can be appreciated from the foregoing, the optical disc drive according to the present invention automatically controls the sled loop gain according to the minimum driving voltage Vsmv0 for the sled motor, thereby enhancing reliability of the product.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A device for automatically controlling a sled loop gain of a sled motor in an optical disc drive which drives an optical disc, comprising:

a pickup to irradiate a laser beam onto the optical disc and to receive a reflected beam to read a signal recorded on the optical disc, to generate a read signal;

a tracking error detector connected to said pickup, to detect a tracking error signal from said read signal;

a phase compensator connected to said tracking error detector, to compensate for a phase deviation of said tracking error signal;

a first lowpass filter connected to said phase compensator, to control said phase-compensated tracking error signal according to a fixed gain, to generate a gain controlled signal;

a controller to cause said pickup to jump a plurality of tracks when the laser beam is on-track, and to determine a sled loop gain for controlling the gain controlled signal output from said first lowpass filter to be changed to a minimum driving voltage upon completion of said track jump;

a second lowpass filter to control the gain controlled signal output from said first lowpass filter according to the sled loop gain generated by said controller, to generate a drive signal; and a sled motor driver to drive the sled motor according to the drive signal output from said second lowpass filter.

2. A method for automatically controlling a sled loop gain of a sled motor in an optical disc drive having a pickup including a lens and a laser diode, comprising:

compensating for a phase deviation of a tracking error signal detected from a signal read from an optical disc, and controlling the phase-compensated tracking error signal according to a fixed gain, to generate a gain controlled signal, wherein the signal is produced from a laser beam irradiated by the laser diode, through the lens and onto the optical disc;

causing the lens to jump a plurality of tracks when the laser beam passed through the lens is on-focus and on-track;

reading the gain controlled signal if the laser beam passed through the lens is on-track after jumping the plurality of tracks;

determining the sled loop gain for controlling the gain controlled signal to be changed to a minimum driving voltage for driving the sled motor; and controlling said gain controlled signal according to said sled loop gain.

3. An optical disc drive device to drive a sled motor which moves a pickup unit between tracks of an optical disc having a data signal recorded therein, the optical disc drive device comprising:

the pickup unit to irradiate a laser beam on the optical disc, and to receive the reflected beam, to generate a read signal;

a processing unit to generate a driving voltage signal in response to the read signal; and an automatic controlling unit to automatically adjust a sled loop gain based upon the driving voltage signal, and to convert the driving voltage signal into a sled motor driving signal based upon the adjusted sled loop gain.

4. The optical disc drive device as claimed in claim 3, wherein said automatic controlling unit automatically adjusts the sled loop gain, in response to making a determination that the laser beam is on-track with regard to one of the tracks and then causing the pickup unit to jump a plurality of the tracks.

5. The optical disc drive device as claimed in claim 4, wherein said automatic controlling unit automatically adjusts the sled loop gain so that the driving voltage signal is converted into a minimum driving voltage of the sled motor after the laser beam is on-track with regard to one of the tracks and the pickup unit jumps the plurality of the tracks.

6. The optical disc drive device as claimed in claim 5, wherein said processing unit comprises:

a tracking error detector to determine a tracking error signal from the read signal; and a phase compensator to compensate for a phase deviation of the tracking error signal, to generate the driving voltage signal.

7. The optical disc drive device as claimed in claim 3, wherein said automatic controlling unit comprises:

a first lowpass filter to control the driving voltage signal according to a fixed gain, to generate a gain controlled signal;

a controller to automatically adjust the sled loop gain, in response to making a determination that the laser beam is on-track with regard to one of the tracks and causing the pickup unit to jump a plurality of the tracks; and a second lowpass filter to convert the gain controlled signal to a minimum driving voltage of the sled motor in response to the adjusted sled loop gain.

8. The optical disc drive device as claimed in claim 7, wherein said pickup unit includes a lens to direct the laser beam toward the optical disc and the reflected beam away from the optical disc, the optical disc drive device further comprising:

a tracking coil driver to generate a tracking voltage signal based upon the driving voltage signal; and a tracking actuator to shift a position of the lens relative to the optical disc based upon a polarity and amplitude of the tracking voltage signal.

9. The optical disc drive device as claimed in claim 7, wherein said processing unit comprises:

a tracking error detector to determine a tracking error signal from the read signal; and a phase compensator to compensate for a phase deviation of the tracking error signal, to generate the driving voltage signal.

10. The optical disc drive device as claimed in claim 8, wherein said processing unit comprises:

a tracking error detector to determine a tracking error signal from the read signal; and a phase compensator to compensate for a phase deviation of the tracking error signal, to generate the driving voltage signal.

11. The optical disc drive device as claimed in claim 8, wherein said automatic controlling unit automatically selects a number of the plurality of the tracks for the pickup to jump based upon a viewing angle of the lens.

12. The optical disc drive device as claimed in claim 3, wherein said processing unit comprises:
   a tracking error detector to determine a tracking error signal from the read signal; and
   a phase compensator to compensate for a phase deviation of the tracking error signal, to generate the driving voltage signal.

13. An optical disc drive device to drive a sled motor which moves a pickup unit between tracks of an optical disc having a data signal recorded therein, the optical disc drive device comprising:
   the pickup unit to irradiate a laser beam on the optical disc, and to receive the reflected beam, to generate a read signal;
   a processing unit to generate a driving voltage signal in response to the read signal; and
   a controller to determine that the laser beam is on-focus and on-track, and if the laser beam is on-focus and on-track, causing the pickup to jump a plurality of the tracks, and immediately after causing the pickup to jump the plurality of the tracks, adjusting a sled loop gain based upon the driving voltage signal, and converting the driving voltage signal into a sled motor driving signal based upon the adjusted sled loop gain.

14. The optical disc drive device as claimed in claim 13, wherein said controller adjusts the sled loop gain so that the driving voltage signal is converted into a minimum driving voltage of the sled motor.

15. A method of driving a sled motor which moves a pickup unit having a lens between tracks of an optical disc having a data signal recorded therein, comprising:
   determining whether a laser beam passed through the lens to read the data signal is in an on-focus state;
   determining whether the laser beam is on-track if the laser beam is in the on-focus state;
   having the pickup jump a plurality of the tracks if the laser beam is on-track; and
   adjusting a sled loop gain of the sled motor if the pickup jumps the plurality of tracks.

16. The method as claimed in claim 15, further comprising:
   reading the data signal from the optical disc;
   generating a driving voltage based upon the read data signal; and
   performing a fixed gain on the driving voltage to generate a voltage controlled signal;
   wherein said adjusting the sled loop gain comprises using the voltage controlled signal to determine the sled loop gain so that voltage controlled signal processed with the sled loop gain is a minimum driving voltage of the sled motor.

17. The method as claimed in claim 16, wherein said performing the fixed gain comprises lowpass filtering the driving voltage with the fixed gain, to generate the voltage controlled signal, and
   the method further comprising lowpass filtering the voltage controlled signal in accordance with the adjusted sled loop gain, to generate the minimum driving voltage of the sled motor.

18. The method as claimed in claim 17, wherein said generating the driving voltage comprises:
   determining a tracking error signal from the read data signal; and
   compensating for a phase deviation of the tracking error signal, to generate the driving voltage.

19. The method as claimed in claim 16, wherein said generating the driving voltage comprises:
   determining a tracking error signal from the read data signal; and
   compensating for a phase deviation of the tracking error signal, to generate the driving voltage.

20. The method as claimed in claim 16, further comprising:
   generating a tracking voltage from the driving voltage; and
   moving the lens within one of the tracks to perform fine track control based upon the tracking voltage.

* * * * *

UNITED STATES PATENT AND TRADEMARK OFFICE
CERTIFICATE OF CORRECTION

PATENT NO.    : 6,222,802 B1                               Page 1 of 1
DATED         : April 24, 2001
INVENTOR(S)   : Byung-In MA It is certified that error appears in the above-identified patent and that said Letters Patent is hereby corrected as shown below:

<u>Title page,</u>
Please insert the following Foreign Priority:
-- [30] May 19, 1997 [KR] Rep. Of Korea............19222 --.

Signed and Sealed this

Nineteenth Day of February, 2002

Attest:

Attesting Officer

JAMES E. ROGAN
*Director of the United States Patent and Trademark Office*